(12) United States Patent
Fiske

(10) Patent No.: US 7,770,018 B2
(45) Date of Patent: *Aug. 3, 2010

(54) SETTING UP A SECURITY ACCESS SYSTEM

(75) Inventor: Michael Fiske, San Francisco, CA (US)

(73) Assignee: Biogy, Inc., San Francisco, CA (US)

(*) Notice: Subject to any disclaimer, the term of this patent is extended or adjusted under 35 U.S.C. 154(b) by 1289 days.

This patent is subject to a terminal disclaimer.

(21) Appl. No.: 11/136,851

(22) Filed: May 25, 2005

(65) Prior Publication Data

US 2006/0107040 A1  May 18, 2006

Related U.S. Application Data

(63) Continuation-in-part of application No. 11/134,123, filed on May 20, 2005, now abandoned, which is a continuation-in-part of application No. 11/131,652, filed on May 17, 2005, and a continuation-in-part of application No. 11/106,930, filed on Apr. 14, 2005, now Pat. No. 7,707,622, which is a continuation-in-part of application No. 11/106,183, filed on Apr. 13, 2005, now Pat. No. 7,702,911, which is a continuation-in-part of application No. 11/104,357, filed on Apr. 12, 2005, which is a continuation-in-part of application No. 11/104,343, filed on Apr. 11, 2005, now abandoned, which is a continuation-in-part of application No. 11/102,407, filed on Apr. 7, 2005, which is a continuation-in-part of application No. 11/100,803, filed on Apr. 6, 2005, now Pat. No. 7,669,236.

(60) Provisional application No. 60/646,463, filed on Jan. 24, 2005, provisional application No. 60/637,536, filed on Dec. 20, 2004.

(51) Int. Cl.
   *G06F 21/00* (2006.01)

(52) U.S. Cl. .................. 713/182; 713/184; 380/44

(58) Field of Classification Search .................. None
   See application file for complete search history.

(56) References Cited

U.S. PATENT DOCUMENTS 5,481,672 A   1/1996   Okuno et al.

(Continued)

FOREIGN PATENT DOCUMENTS

WO   WO 02/35453 A1   5/2002

(Continued)

OTHER PUBLICATIONS

Stosz J D et. al: "Automated System for Fingerprint Authentication Using Pores and Ridge Structure" Proceedings of the SPIE—The International Society for Optical Engineering, SPIE, PO Box 10 Bellingham WA 98227-0010 USA, vol. 2277, Jul. 28, 1994, pp. 210-223, ISSN: 0277-786X.

(Continued)

*Primary Examiner*—Pramila Parthasarathy
(74) *Attorney, Agent, or Firm*—David Lewis

(57) ABSTRACT

In an embodiment, a secure module is provided that provides access keys to an unsecured system. In an embodiment, the secure module may generate passcodes and supply the passcodes to the unsecured system. In an embodiment, the access keys are sent to the unsecured system after receiving the passcode from the unsecured system. In an embodiment, after authenticating the passcode, the secure module does not store the passcode in its memory. In an embodiment, the unsecured module requires the access key to execute a set of instructions or another entity. In an embodiment, the unsecured system does not store access keys. In an embodiment, the unsecured system erases the access key once the unsecured system no longer requires the access key. In an embodiment, the unsecured system receives a new passcode to replace the stored passcode after using the stored passcode. Each of these embodiments may be used separately.

27 Claims, 8 Drawing Sheets

U.S. PATENT DOCUMENTS

| | | | |
|---|---|---|---|
| 5,612,683 | A | 3/1997 | Trempala et al. |
| 5,616,683 | A | 4/1997 | Neuert et al. |
| 5,825,880 | A | 10/1998 | Sudia et al. |
| 5,903,225 | A | 5/1999 | Schmitt et al. |
| 5,923,756 | A | 7/1999 | Shambroom |
| 5,963,656 | A | 10/1999 | Bolle et al. |
| 6,035,398 | A | 3/2000 | Bjorn |
| 6,112,187 | A | 8/2000 | Fukawa |
| 6,154,879 | A | 11/2000 | Pare et al. |
| 6,307,956 | B1 | 10/2001 | Black |
| 6,308,268 | B1 * | 10/2001 | Audebert ............... 713/182 |
| 6,311,270 | B1 | 10/2001 | Challener et al. |
| 6,314,425 | B1 | 11/2001 | Serbinis et al. |
| 6,421,453 | B1 | 7/2002 | Kanevsky et al. |
| 6,607,136 | B1 | 8/2003 | Atsmon et al. |
| 6,636,973 | B1 | 10/2003 | Novoa et al. |
| 6,748,588 | B1 | 6/2004 | Fraser et al. |
| 6,782,120 | B2 * | 8/2004 | Modl et al. ............... 382/124 |
| 6,956,833 | B1 | 10/2005 | Yukie et al. |
| 6,956,883 | B2 | 10/2005 | Komoto |
| 6,970,183 | B1 | 11/2005 | Monroe |
| 7,012,503 | B2 | 3/2006 | Nielsen |
| 7,020,645 | B2 | 3/2006 | Bisbee et al. |
| 7,028,185 | B2 | 4/2006 | Wheeler et al. |
| 7,066,382 | B2 | 6/2006 | Kaplan |
| 7,069,444 | B2 | 6/2006 | Lowensohn et al. |
| 7,142,699 | B2 | 11/2006 | Reisman et al. |
| 7,205,882 | B2 | 4/2007 | Libin |
| 7,308,708 | B2 | 12/2007 | Blume |
| 7,319,987 | B1 | 1/2008 | Hoffman et al. |
| 7,353,541 | B1 | 4/2008 | Ishibashi et al. |
| 7,373,515 | B2 * | 5/2008 | Owen et al. ............... 713/182 |
| 7,415,614 | B2 | 8/2008 | Guillou |
| 7,423,515 | B1 | 9/2008 | Fiske et al. |
| 2001/0037450 | A1 | 11/2001 | Metlitski et al. |
| 2002/0040346 | A1 | 4/2002 | Kwan |
| 2002/0095586 | A1 | 7/2002 | Doyle et al. |
| 2002/0111942 | A1 | 8/2002 | Campbell et al. |
| 2003/0063782 | A1 | 4/2003 | Acharya |
| 2003/0152947 | A1 | 8/2003 | Crossman et al. |
| 2003/0156011 | A1 | 8/2003 | Modl et al. |
| 2003/0158960 | A1 | 8/2003 | Engberg |
| 2003/0169910 | A1 | 9/2003 | Reisman |
| 2004/0187018 | A1 | 9/2004 | Owen et al. |
| 2004/0199775 | A1 | 10/2004 | Ser et al. |
| 2004/0267387 | A1 | 12/2004 | Samadani |
| 2005/0036611 | A1 * | 2/2005 | Seaton et al. ............... 380/44 |
| 2005/0193198 | A1 | 9/2005 | Livowsky |
| 2005/0210267 | A1 | 9/2005 | Sugano et al. |
| 2006/0107040 | A1 | 5/2006 | Fiske |
| 2006/0107041 | A1 | 5/2006 | Fiske |
| 2006/0107063 | A1 | 5/2006 | Fiske |
| 2006/0107064 | A1 | 5/2006 | Fiske |
| 2006/0107065 | A1 | 5/2006 | Fiske |
| 2006/0107067 | A1 | 5/2006 | Safal et al. |
| 2006/0107068 | A1 | 5/2006 | Fiske |
| 2006/0107309 | A1 | 5/2006 | Fiske |
| 2006/0107312 | A1 | 5/2006 | Fiske |
| 2006/0107315 | A1 | 5/2006 | Fiske |
| 2006/0107316 | A1 | 5/2006 | Fiske |
| 2006/0117188 | A1 | 6/2006 | Fiske |
| 2006/0230284 | A1 | 10/2006 | Fiske |
| 2007/0118754 | A1 | 5/2007 | Togashi et al. |
| 2008/0288786 | A1 | 11/2008 | Fiske |

FOREIGN PATENT DOCUMENTS

| | | |
|---|---|---|
| WO | PCT/US2005/041799 | 5/2006 |
| WO | PCT/US2005/046215 | 6/2006 |
| WO | PCT/US2006/002271 | 8/2006 |

OTHER PUBLICATIONS

Andrea R Roddy et. al: "Fingerprint Features-Statistical Analysis and System Performance Estimates" 19970901, vol. 85, No. 9, Sep. 1, 1997.

Roddy et. al: "Fingerprint feature processing techniques and poroscopy" Jan. 1, 1999, Intelligent Biometric Techniques in Fingerprint and Face Recognition, Boca Raton, FL : CRC Press, US, pp. 37-105 * 3.3 and 5; pp. 56-59.

Bindra B et. al: "Poroscopy: A method of personal identification revisited" Anil Aggrawal's Internet Journal of Forensic Medicine and Toxicology, Anil Aggrawal's Internet Journal of Forensic Medicine and Toxicology, India, vol. 1, No. 1, Jan. 1, 2000, ISSN: 0972-8074 [retrieved on May 16, 2000].

Henry Lee et. al (editor): "Chapter 8: Automated Fingerprint Identification and Imaging Systems, Advances in Fingerprint Technology, Second Edition" Jun. 15, 2001, Advances in Fingerprint Technology; [CRC Series in Forensic and Police Science], CRC Press LLC, Boca Raton, Florida, USA, pp. 275-326.

Christopher Champod et. al: "Fingerprints and Other Ridge Skin Impressions, Passage" Apr. 27, 2004, Fingerprints and Other Ridge Skin Impressions, CRC Press LLC, 2000 N.W. Corporate Blvd., Boca Raton, Florida 33431, BNS pp. 1-9 * figures 2.3, 2.5; table 2.1.

* cited by examiner

SETTING UP A SECURITY ACCESS SYSTEM

CROSS-REFERENCE TO RELATED APPLICATIONS

This application is a continuation-in-part of U.S. patent application Ser. No. 11/134,123, entitled "Using an Access Key," filed May 20, 2005, now abandoned which in turn is a continuation-in-part of U.S. patent application Ser. No. 11/131,652, entitled "Method Of Generating Access Keys," filed May 17, 2005, which in turn claims priority benefit of U.S. Provisional Patent Application No. 60/637,536, entitled "Secure Keys," filed Dec. 20, 2004 and claims priority benefit of U.S. Provisional Patent Application No. 60/646,463, entitled "Passcode Generator," filed Jan. 24, 2005; and U.S. patent application Ser. No. 11/131,652, entitled "Method Of Generating Access Keys." filed May 17, 2005, is in turn a continuation-in-part of U.S. patent application Ser. No. 11/106,930, entitled "API For a System Having a Passcode Authenticator," filed Apr. 14, 2005, now U.S. Pat. No. 7,707,622 which in turn is a continuation-in-part of U.S. patent application Ser. No. 11/106,183, entitled, "Interfacing With a System That Includes a Passcode Authenticator," filed Apr. 13, 2005, now U.S. Pat. No. 7,702,911 which in turn is a continuation-in-part of U.S. patent application Ser. No. 11/104,357, entitled, "System For Generating Requests For Access To a Passcode Protected Entity," filed Apr. 12, 2005, which in turn is a continuation-in-part of U.S. patent application Ser. No. 11/104,343, entitled, "Generating Requests For Access To a Passcode Protected Entity," filed Apr. 11, 2005, which in turn is a continuation-in-part of U.S. patent application Ser. No. 11/102,407, entitled "System For Handling Requests For Access To a Passcode Protected Entity," filed Apr. 7, 2005, which in turn is a continuation-in-part of U.S. patent application Ser. No. 11/100,803, entitled "Determining Whether To Grant Access To a Passcode Protected System," filed Apr. 6, 2005, now U.S. Pat. No. 7,669,236 which in turn claims priority benefit of U.S. Provisional Patent Application No. 60/637,536, entitled "Secure Keys," filed Dec. 20, 2004 and claims priority benefit of U.S. Provisional Patent Application No. 60/646,463, entitled "Passcode Generator," filed Jan. 24, 2005; this application is a continuation-in-part of U.S. patent application Ser. No. 11/100,803, entitled, "Determining Whether to Grant Access to a Passcode Protected System," filed Apr. 6, 2005; this application is a continuation-in-part of U.S. patent application Ser. No. 11/106,930, entitled "API For a System Having a Passcode Authenticator," filed Apr. 14, 2005; this application is also a continuation-in-part of U.S. patent application Ser. No. 11/131,652, entitled, "METHOD OF GENERATING ACCESS KEYS," filed May 17, 2005;

additionally, this application claims priority benefit of U.S. Provisional Patent Application No. 60/637,536, entitled, "Secure Keys," filed Dec. 20, 2004, which is incorporated herein by references; and this application also claims priority benefit of U.S. Provisional Patent Application No. 60/646,463, entitled "Passcode Generator," filed Jan. 24, 2005. All of the above applications are incorporated herein by reference.

This application incorporates herein by reference U.S. Provisional Patent Application No. 60/629,868, entitled, "Finger Print Quality Assurance," filed Nov. 18, 2004. This application also incorporates herein by reference U.S. Provisional Patent Application No. 60/631,199, entitled "Fingerprint Quality Assurance," filed Nov. 26, 2004.

This application also incorporates herein by reference U.S. patent application Ser. No. 10/778,503, entitled "FPALM Fingerprint Authentication Lock Mechanism," filed Feb. 15, 2004. This application also incorporates herein by reference U.S. patent application Ser. No. 10/889,237, entitled "FPALM II Fingerprint Authentication Lock Mechanism II," filed Jul. 11, 2004.

FIELD

The specification generally relates to a security access system.

BACKGROUND

In typical cryptographic systems, one or more encryption keys are created on the sender's computer or device and are used to transmit an encrypted message to another computer or device. The receiver also has one or more encryption keys to decrypt the message. Typical encryption keys have a length of 128 bits, 256 bits, 512 bits, or larger. Since most people are incapable of remembering an encryption key this long, these encryption keys are stored on a computer or other device that often requires a shorter, less secure, password to access. This creates a situation, where the password is often much easier to obtain than the encryption keys. Furthermore, many operating systems have many security flaws, so often a sophisticated intruder does not have to obtain the password. The intruder can gain access to the computer containing the encryption keys, and the cryptographic system's security is compromised.

It is possible to scan fingerprints into computers, rather than enter a password, to access computers. However, such systems are not secure, because the fingerprints, or derived fingerprint information, can be captured by an intruder. Consequently, the security of the whole system is compromised.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies that may be discussed in the specification, and some embodiments may not address any of these deficiencies.

In general, at the beginning of the discussion of each of FIGS. 1-7 is a brief description of each element, which may have no more than the name of each of the elements in the one of FIGS. 1-7 that is being discussed. After the brief description of each element, each element is further discussed. In some of FIGS. 1-7 the further discussion of each element is usually in the numerical order of the elements. In some of FIGS. 1-7 the further discussion of each element discusses a group of the elements together. In some of FIGS. 1-7 after the further discussion of each element, there is a discussion of how all the elements cooperate with one another. In general, each of FIGS. 1-10 is discussed in numerical order, and the elements within FIGS. 1-10 are also usually discussed in numerical order to facilitate easily locating the discussion of a particular element. Nonetheless, there is no one location where all of the information of any element of FIGS. 1-10 is necessarily located. Unique information about any particular element or any other aspect of any of FIGS. 1-10 may be found in, or implied by, any part of the specification.

Figure 1:
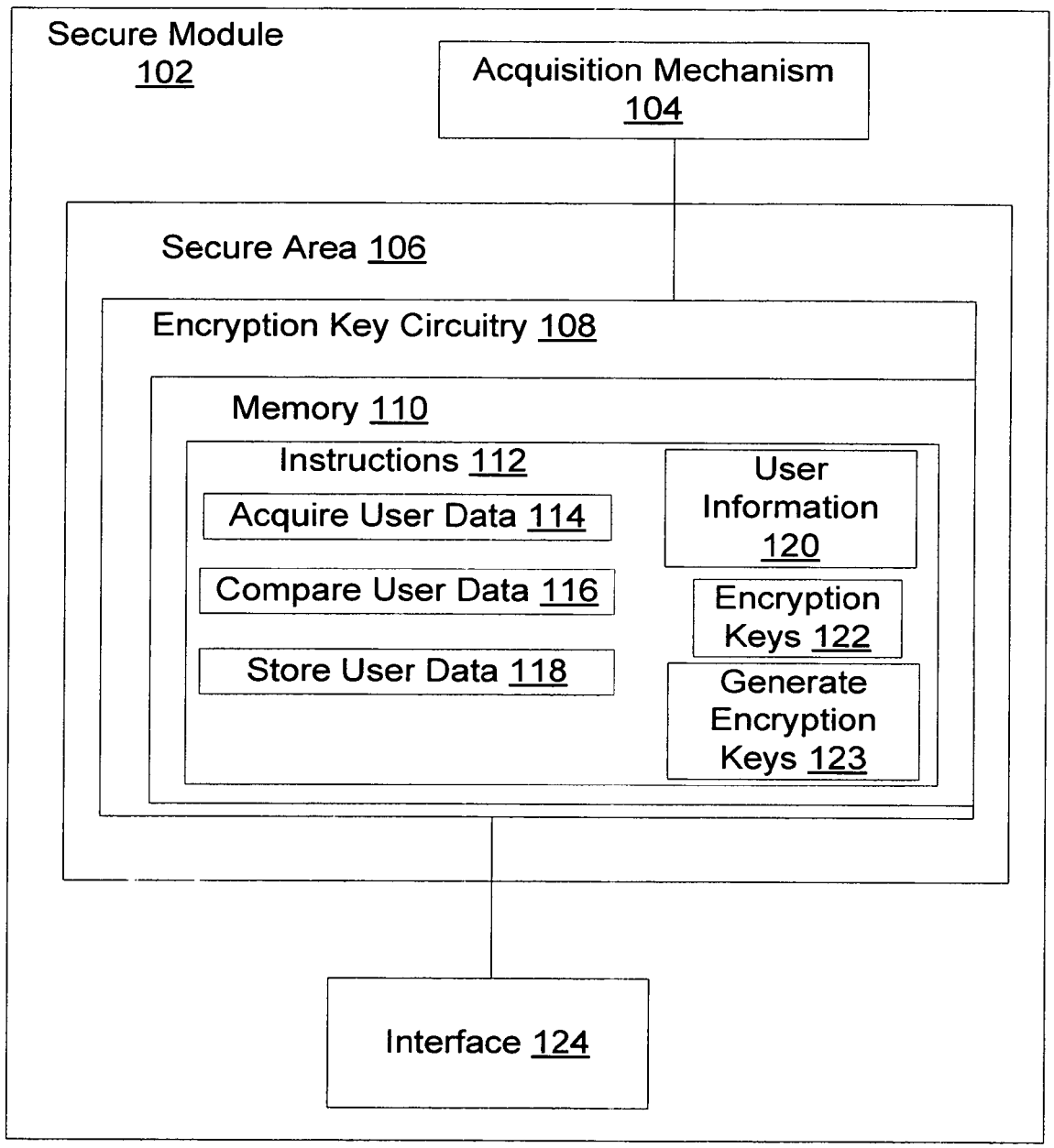
FIG. 1 shows a block diagram of a system for encrypting and decrypting items.

FIG. 1 shows a block diagram of system 100 for encrypting and decrypting items. System 100 includes a secure module 102 and acquisition mechanism 104, which includes secure area 106. Secure area 106 may include encryption key circuitry 108 having memory 110. Memory 110 may include instructions 112, which may include instructions for acquire user data 114, compare user data 116, and store user data 118. Memory 110 may also include user information 120 and encryption key 122. Instructions 112 may also include generate encryption keys 123. Secure module 102 may also include interface 124. System 100 may also include unsecured system 126, which runs encryption instructions 128. In other embodiments system 100 may not have all of the components listed above or may have other components instead of and/or in addition to those listed above.

Secure module 102 may include any of a number of systems. In an embodiment, secure module 102 is configured so that it is difficult to access the inner working of secure module 102. In other words, secure module 102 may be configured so that it is difficult to examine and/or alter the contents of any memory within secure module 102 and/or to send commands to secure module 102.

Acquisition mechanism 104 may be a sensor, and may enable secure module 102 to acquire (e.g., scan in or receive) user data, such as fingerprints, other biometric data, or other user data. For example, if acquisition mechanism 104 includes a fingerprint sensor, acquisition mechanism 104 may include an area sensor or a sweep sensor.

Secure area 106 is a region within secure module 102 within which various security measures have been implemented. For example, the security of the secure area 106 may be enhanced by any one of, any combination or of, or all of (1) the use of embedded software, (2) the lack of an operating system, and (3) the secure area being at least part of a self-contained device separate from unsecured system 126. For example, the unit that includes the secure area 106 (e.g., secure module 102) may contain its own processor.

Encryption key circuitry 108 generates encryption keys and may have other functions. Encryption key circuitry 108 may include circuitry configured for generating encryption keys or may include a processor configured (e.g., programmed) for generating encryption keys. Encryption key circuitry 108 may include a combination of a processor and specialized circuitry configured for performing a particular method or computation. Encryption key circuitry 108 may communicate with acquisition mechanism 104 and with a host computer. Although not necessary, in some embodiments, acquisition mechanism 104 and encryption key circuitry 108 could be integrated into a single chip. Alternatively, acquisition mechanism 104 and encryption key circuitry 108 may be in two separate chips. Throughout this specification encryption key circuitry 108 may be replaced with access key circuitry to obtain different embodiments.

Memory 110 may be incorporated within encryption key circuitry 108 and may include volatile and nonvolatile memory. The use of non-volatile memory enables the secure module 102 to permanently store user information, executable code, and/or encryption keys. In some embodiments, the memory 110 is on (e.g., "onboard") encryption key circuitry 108. Memory 110 may include embedded instructions that are executed by encryption key circuitry 108.

Instructions 112 are stored on memory 110, and may include embedded instructions executed by encryption key circuitry 108. Instructions 112 may be capable of generating passcodes (e.g., a password) based on user data. In this specification the word passcode is generic to the word password in that a passcode can be any code. Through out this specification, the word passcode may be replaced by the word password to obtain a specific embodiment. The passcodes may be caused to be sent to an unsecured device and/or to be used to authenticate a passcode received from an unsecured device. Instructions 112 may be capable of generating encryption keys based on user data and/or passcodes based on encryption keys. Instructions 112 may also be capable of authenticating a set of newly acquired user data (e.g., fingerprints) by comparing the newly acquired user data with stored user information (e.g. stored characteristics of fingerprints).

Acquire user data 114 may include instructions for acquiring a fingerprint and/or other user data from acquisition mechanism 104. Compare user data 116 may include instructions for comparing and/or matching acquired user data with stored user information. Store user information 118 may include instructions for storing user information acquired by acquire user data 114 from acquisition mechanism 104.

User information 120 may be the user data acquired by acquire user data 114. Alternatively, user information 120 may include information derived from the user data acquired using acquire user data 114. For example, if acquisition mechanism 104 acquires fingerprints, user information may include information characterizing the fingerprints instead of, or in addition to, the actual fingerprints. User information 120 may be, or may be based upon, many other types of user data in addition to, or instead of, fingerprints. For example, user information 120 may include a name, a birthday, a favorite number, a social security number, a driver's license, a profile, an image of a face, an iris scan, a toe print, a handprint, and/or a footprint. In an embodiment, the item used to generate the passcodes is any item that is unique. In an embodiment, the item used to generate the passcode is one that is difficult to fabricate, guess, find by trial and error, and/or compute. In an embodiment, the item used to generate the passcodes is uniquely associated with the user. In an embodiment, the item used to generate the passcodes has an unpredictable element to it (e.g., the unpredictable manner in which the patterns of lines in fingerprints differ between fingerprints).

As explained in U.S. patent application Ser. No. 11/100,803, Ser. No. 11/102,407, Ser. No. 11/104,343, Ser. No. 11/104,357, and Ser. No. 11/106,183, and Ser. No. 11/106,930, any sequence of bits (which may represent any string of symbols) may be used as a passcode. In some cases, the passcode may be directly transmitted to another system without human intervention, and therefore the sequence of bits may not have a visual display in standard formats such as ASCII, Unicode, and so on. For example, the first sequence of 8 bits in the passcode could, in ASCII, represent the end of file character, which currently does not have a visual representation. In other embodiments where the passcode is displayed as a sequence of symbols on a graphical display, the symbols may be chosen from any subset of, or combination of, alphanumeric symbols, punctuation symbols, picture symbols, math symbols, upper case symbols, and/or lower case symbols, for example. The choice of alphanumeric symbols may include characters from a multiplicity of languages. An example of an alphanumeric passcode with 8 symbols 4R1pa5Wx. An example of a possible passcode with 8 symbols is ♀3⊐♪Ↄ⚊š☺. An example with 16 symbols including punctuation and other symbols is &x#WЛЯq61!j$uS_m.

Encryption keys 122 may include one or more encryption keys, which are codes (sequences of bits or symbols) that are used for generating passcodes. Encryption keys 122 may be used by an encryption algorithm to encrypt and/or decrypt data. In this specification, encryption keys 122 may also be represented by the symbol $K_d$. Encryption keys 122 may be stored on secure module 102. Encryption keys 122 may be stored in the internal memory (e.g., memory 110) of encryption key circuitry 108. One or more fingerprint images and/or other user data may be used to determine values for encryption keys 122. Using user information 120 to create encryption keys 122 helps ensure that the encryption key of each user is unique. Encryption keys 122 may be used as seed values for an encryption method that is implemented on an unsecured system. In another embodiment, encryption keys 122 are not used as seed values, but are just an access code, which may be referred to as an access key, for a method or other entity associated with the unsecured system.

Encryption keys 122 may be used as the registration code and/or the passcode generator of U.S. patent application Ser. No. 11/100,803, Ser. No. 11/102,407, Ser. No. 11/104,343, Ser. No. 11/104,357, Ser. No. 11/106,183, and Ser. No. 11/106,930. Thus, similar to the passcode, any sequence of bits or sequence of symbols may be used as one of encryption keys 122. In some cases, encryption keys 122 may be directly transmitted without human intervention, and consequently the sequence of bits may not have a visual display in standard formats such as ASCII, Unicode, and so on. For example, the first sequence of 8 bits in one of encryption keys 122 could, in ASCII, represent the end of file character, which currently does not have a visual representation. In other embodiments where the encryption keys 122 are displayed as a sequence of symbols on a graphical display, the symbols may be chosen from any subset of or combination of alphanumeric symbols, punctuation symbols, picture symbols, math symbols, upper case symbols, and/or lower case symbols, for example. The choice of alphanumeric symbols may include characters from a multiplicity of languages. An example of an encryption key with 16 symbols is 1Ae58GnZbk3T4 pcQ, and an encryption key with punctuation and other symbols may also be used. An example with 32 symbols is 1!56hs#K♀3_4xP*7:y2iW=K; r.+4vN?. There may be at least one encryption key for each user, secure module 102, and/or unsecured system 126. The same criterion and/or restrictions may be used for both passcodes and encryption keys 122 for determining what sequences of characters are valid. Throughout this specification encryption keys may be replaced with access keys to obtain different embodiments. Each of encryption keys 122 may have different parts stored in different locations within memory 110.

Generate encryption keys 123 is a method for generating encryption keys 122 using user information 120. Although in FIG. 1 generate encryption keys 123 is depicted as separate from instructions 112, generate encryption keys 123 may be included within instructions 112. Generate encryption keys 123 may implement a method that uses user information 120 as a seed for generating encryption keys 122.

Generate encryption keys 123 may be a "one-way" method, which is a method for which finding an inverse or for which finding the input based on the output is expected to be difficult or intractable. Throughout this specification generate encryption keys 123 may be replaced with instructions for generating access keys to obtain a different embodiment. Stated differently, a one-way method $\Phi$ has the property that given an output value z, it is not possible or computationally extremely difficult to find an input (e.g., message) $m_z$ such that $\Phi(m_z)=z$. For some one-way functions, it could take over $10^{30}$ years of computer processor execution time to compute $\Phi^{-1}(z)$. In other words, a one-way method $\Phi$ is a method that can be easily computed, but that has an inverse $\Phi^{-1}$ that is extremely difficult (e.g., impossible) to compute. One manner of quantifying the difficulty of finding $m_z$ (given an output z) is to use the number of computations that are expected to be required to compute and/or guess $m_z$. For one type of method, it is expected to take between $O(2^{n/2})$ and $O(2^n)$ (e.g. between $2^{n/2}$ and $2^n$) computational steps to find or guess $m_z$, (depending on the how clever the one performing the computations is), where n is the number of bits in the output z. The method $\Phi$ (which may be referred to as a generating method) may be a one-way algorithm, a one-way function, and/or another one-way method. By using a one-way method for computing encryption keys 122, even if one of encryption keys 122 is intercepted, stolen, or otherwise obtained, it is unlikely that the encryption key can be used to discover user information 120 or (if user information 120 was derived from user data) used to discover the user data from which user information 120 was derived.

One set of methods that may be used are one-way methods in which finding the inverse involves an operation that is mathematically indeterminate, impossible, intractable, computationally impractical, or computationally difficult. For example, one method is to use a collection of step functions each of whose domain and range is [0, 1, 2, . . . 255] and apply a distinct one of the step functions to a part of user information 120. User information 120 could be used to determine which step functions to select from the collection. If 16 step functions are chosen from the collection, then this would create an output having 128 bits. If n step functions are chosen from the collection, then this would create an output of 8n bits. An alternative to selecting the step function would be to construct 32 matrices resulting from the step functions and compute the determinant modulo 256 for each of the 32 matrices. This creates a one-way method whose output is 256 bits.

As another example, one-way method $\Phi$ could involve first representing user information 120 by a string of digits. Then, each digit of the string of digits could be multiplied by a corresponding digit from another string of digits, where at least one digit of the other string has a value of zero. The inverse of this method would involve at least one division by zero for each multiplication by a digit with the value of zero, which has no inverse, and consequently this method would also be one-way. Similarly, functions for which finding their inverses involves computing a non-convergent series or non-convergent integral are other examples of classes of functions that may be used as one-way methods.

Another class of one-way methods involves computations that cause a loss of information or a discarding of selected pieces of information. Since some of the input information is lost in computing this class of one-way methods, the original input information (e.g., user information 120) is difficult and may be impossible to recover. For example, a one-way method may be constructed by first performing a randomizing operation such as discarding random bits of information from the input, adding random bits of information to the input, and/or performing another randomizing operation to the input, and then another method (e.g., function) may be applied to the information retained. Similarly, the same randomizing operations may be performed on the output of the one-way method.

In an embodiment, generate encryption key 123 includes a hash function. A "hash function," denoted $\Phi$, is a function that accepts as its input argument an arbitrarily long string of bits (or bytes) and produces a fixed-size output. In other words, a hash function maps a variable length input m to a fixed-sized output, $\Phi(m)$. Typical output sizes range from 128 to 512 bits, but can also be larger or smaller. An ideal hash function is a function $\Phi$ whose output is "uniformly distributed." In other words, suppose the output size of $\Phi$ is n bits. If the message m is chosen randomly, then for each of the $2^n$ possible outputs for z, the probability that $\Phi(m)=z$ is $2^{-n}$. In an embodiment, the hash functions used in generate encryption key 123 are one-way.

In contrast to an ideal hash function, if the input m is chosen randomly, then for each of the $2^n$ possible outputs for z, the probability that $\Phi(m)=z$ is a value P, which is compared to $2^{-n}$. In an embodiment, the hash function is designed so that P is relatively close to $2^{-n}$. How close P is to $2^{-n}$ is a measure of the quality of the hash function. The chi-square function on n−1 degrees of freedom is a useful way to measure the quality of a real hash function. One uses a chi-square on n−1 degrees, because there are n bits of output. A confidence level that the real hash function is close to an ideal hash function (or has a certain quality) can be computed based on the chi-square function. Some typical confidence levels could be at least 90%, at least 95%, at least 99%, at least 99.5%, at least 99.999%, or greater depending on the level of security desired. In an embodiment, these confidence levels may represent a confidence that at least $2^{n/100}$ to $2^n$ computations are required to find the inverse of the hash function. In another embodiment, the above confidence levels represent a confidence that at least $2^{n/2}$ to $2^n$ computations are required to find the inverse of the hash function. In an embodiment, these confidence levels may represent a confidence that at least $2^{log(n)}$ to $2^n$ computations are required to find the inverse of the hash function. In an embodiment, these confidence levels may represent a confidence that at least $0.9(2^n)$ to $2^n$ computations are required to find the inverse of the hash function. In an embodiment, the hash functions that are used are one-way. Other types of one-way functions or methods may be used in place of a hash function.

Any of a number of hash functions may be used for one-way method $\Phi$. One possible hash function is SHA-256, designed by the National Security Agency and standardized by the NIST, [NIST_STANDARDS_1995], which is incorporated herein by reference. The output size of SHA-256 is 256 bits. Other examples of alternative hash functions are of those that are of the type that conforms to the standard SHA-1, which produces output values of 128 bits, and SHA-512, which produces output values of 512 bits, see [NIST_STANDARDS_2001], which in incorporated herein by reference.

There are different methods that may be used for hashing user information 120, such as fingerprints. Different types of methods of hashing user information 120 are appropriate for different sizes of encryption keys, and different types of user information 120 that may be passed to the hash function. One method is to take two different pieces of user information 120 (e.g., two fingerprints) and apply the hash function SHA-256 to each piece of user information 120. For ease of explanation, denote the hash function SHA-256 as $\Phi_1$. Each application of $\Phi_1$ to user information 120 produces an output value of 256 bits. With two pieces of user information 120, (e.g., two fingerprints), these bits are concatenated together to create a 512-bit encryption key, called $K_d$. Another method is to use two different sections S and T of a single acquired set of pieces of user data (e.g., two sections of one fingerprint), and produce a 512-bit encryption key, $K_d$, by concatenating $\Phi_1(S)$ and $\Phi_1(T)$. An enhancement of this method can be used to create encryption keys larger than 512-bits. Divide one acquired piece of user information 120 (e.g., one fingerprint) into n sections: $S_1, S_2, \ldots, S_n$. Then concatenate the bits $\Phi_1(S_1), \Phi_1(S_2), \ldots, \Phi_1(S_n)$. This creates an encryption key $K_d$ that is 256n bits in length. For example, if user information 120 is divided into 10 sections, then this method would create an encryption key with 2,560 bits.

Another embodiment is to use two different parts of user information, denoted $S_1$ and $S_2$, apply a one-way function $\Phi$ to each part of the finger print information to form fingerprint information that has the same length as each of the parts. For example, let the symbol $\oplus$ denote the exclusive- or function i.e. as a binary operator on bits $0\oplus0=1\oplus1=0$ and $1\oplus0=0\oplus1=1$. $\oplus$ is extended coordinate-wise to strings of bits; as an example, if A=0011 and B=0101, then A$\oplus$B=0110. In an embodiment, a one-way function $\Phi$ is applied to each part and then take an exclusive- or, $\oplus$, of the two results. In other words, the encryption key is $K_d=\Phi(S_1)\oplus\Phi(S_2)$. If $\Phi$ has an output size of m bits, then $K_d$ has a size of m bits. A similar process could be performed using other operators in place of an exclusive- or to create an encryption key $K_d$ having a size of m bits.

Similarly, to create a larger key, start with 2n pieces of user information, $S_1, S_2, \ldots, S_{2n}$. Create n different m-bit keys, $k_1, k_2, \ldots k_n$ where $k_1=\Phi(S_1)\oplus\Phi(S_2)$, $k_2=\Phi(S_3)\oplus\Phi(S_4)$, $k_3=\Phi(S_4)\oplus\Phi(S_5), \ldots, k_n=\Phi(S_{2n-1})\oplus\Phi(S_{2n})$. Then create the key $K_d$ by concatenating these n keys; in other words, $K_d=k_1 k_2 k_3 \ldots k_n$. Thus, $K_d$ has a size of mn bits, where the output of one-way function $\Phi$ is m bits. If $\Phi=\Phi_1$ (i.e. SHA-256), then $K_d$ has a size of 256n bits. A similar process could be performed using other operators in place of an exclusive- or to create an encryption key $K_d$ having a size of mn bits.

Hash functions are discussed in [NIST_STANDARDS_1995] National Institute of Standards and Technology, Secure Hash Standard, Apr. 17, 1995, FIPS PUB 180-1, [e.g., Page 88] and in [NIST_STANDARDS_2001] National Institute of Standards and Technology, Secure Hash Standard, (draft) 2001, Draft FIPS PUB 180-2, [e.g., Page 89], which are each incorporated herein by reference. Hash functions are also discussed in U.S. patent application Ser. No. 11/100,803, Ser. No. 11/102,407, Ser. No. 11/104,343, Ser. No. 11/104,357, and Ser. No. 11/106,183, and Ser. No. 11/106,930.

Although instructions 112, user information 120, encryption keys 122 and generate encryption keys 123 are depicted as contiguous blocks within memory 110, they may be stored in locations that are interdispersed amongst each other. Similarly, although instructions for acquire user data 114, compare user data 116, and store user data 118 are depicted as separate blocks within instructions 112, they may be stored in locations that are inter-dispersed amongst each other. Also, although instructions for acquire user data 114, compare user data 116, store user data 118, and generate encryption keys 123 are depicted at contiguous blocks, they may be lines of codes that are inter-dispersed amongst one another, and may not be separate program units.

Interface system 124 is used to communicate with unsecured system 126. Interface system 124 may be anyone of and/or any combination of a USB port, an RS 232 connection, a wireless connection (e.g., using RFID), a serial port, and/or any of a number of other types of connections.

Unsecured system 126 may be a host computer, encryption device, or other machine that is used for encrypting data. The word "host" refers to a laptop, desktop, other type of computer, or possibly another electronic device. Unsecured system 126 may be a single module or a large system having many components. Unsecured system 126 is referred to as "unsecured" only because, in an embodiment, no steps are necessarily taken to secure unsecured system 126. However, unsecured system 126 may have been secured, and may have any combination of security safeguards protecting it. For example, unsecured system 126 may require entry of a passcode and/or any type of user data (e.g., any of the user data upon which user information 120 may be based) prior to entry. Alternatively, unsecured system 126 may have no security features.

Encryption instructions 128 may be executed by unsecured system 126, and may be instructions that perform encryption. Encryption instructions 128 may require receipt of one of encryption keys 122 to perform the encryption. Encryption instructions 128 may generate a passcode based on encryption keys 122. Alternatively, unsecured system 126 may receive the new passcode from secure module 102 in response to providing the prior passcode that was stored on unsecured system 126. Through out this specification, other embodiments may be obtained by replacing encryption instructions 128 with instructions to perform a task, and replace any discussion of encryption instruction 128 performing encryption or decryption with the instructions performing that task.

As an example of one embodiment, secure module 102 is a USB internal device, which is a secure device having at least a USB connection for interface 124, internal memory for memory 110, fingerprint sensor for acquisition mechanism 104, and a processor for encryption key circuitry 108. In an embodiment, this device does not run an operating system. All fingerprint data or user information 120 is acquired and stored on the USB internal device.

Figure 2:
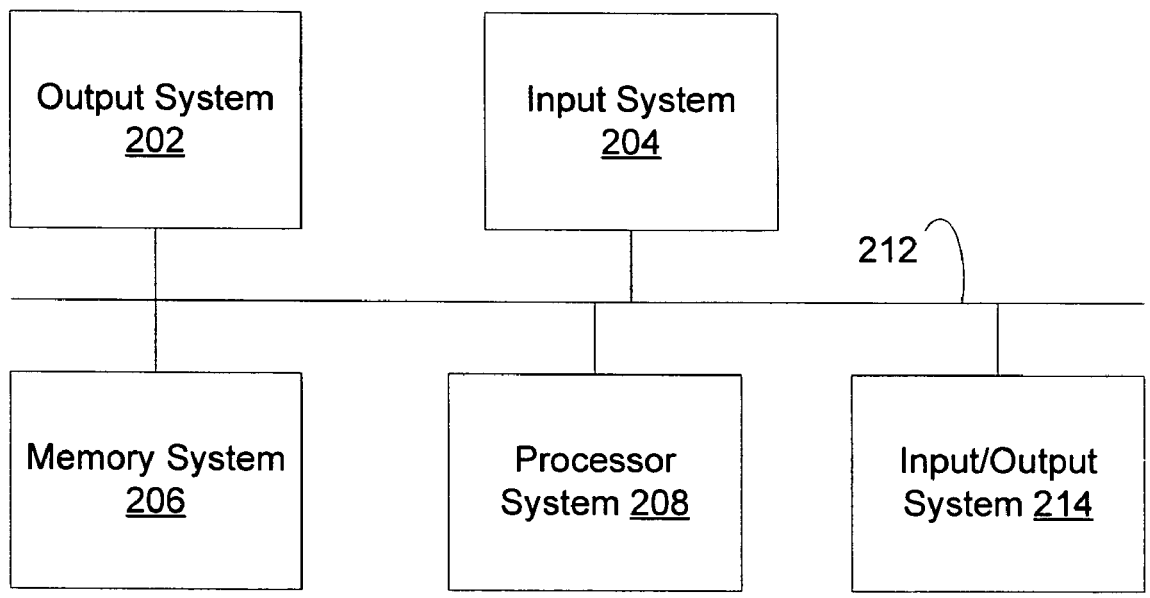
FIG. 2 shows a block diagram of an example of an unsecured system, which may be used in the system of FIG. 1.

FIG. 2 shows a block diagram of an example of an unsecured system 200, which may be used in system 100. Unsecured system 200 may include output system 202, input system 204, memory system 206, processor system 208, communications system 212, and input/output device 214. In other embodiments, unsecured system 200 may not include all of the components listed above or include other components in addition to, and/or instead of, those listed above.

Output system 202 may include any one of, some of, any combination of, or all of a monitor system, a handheld display system, a printer system, a speaker system, a connection or interface system to a sound system, an interface system to peripheral devices and/or a connection and/or interface system to a computer system, an intranet, and/or an internet, for example.

Input system 204 may include any one of, some of, any combination of, or all of a keyboard system (e.g., an encryption keyboard), a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 206 may include, for example, any one of, some of, any combination of, or all of a long term storage system, such as a hard drive; a short term storage system, such as random access memory; a removable storage system, such as a floppy drive, jump drive or other removable drive; and/or flash memory. Memory system 206 may include one or more machine-readable mediums that may store a variety of different types of information.

The term machine-readable medium is used to refer to any medium capable carrying information that is readable by a machine. One example of a machine-readable medium is a computer-readable medium. Another example of a machine-readable medium is paper having holes that are detected and trigger different mechanical, electrical, and/or logic responses. For example, embedded software is stored on a machine-readable medium. The term machine-readable medium also includes mediums that carry information while the information is in transit from one location to another, such as copper wire, air, water, and/or optical fiber. Software versions of any of the components of FIGS. 1-7 may be stored on machine-readable mediums.

Processor system 208 may include any one of, some of, any combination of, or all of multiple parallel processors, a single processor, a system of processors having one or more central processors, and/or one or more specialized processors dedicated to specific tasks.

Communications system 212 communicatively links output system 202, input system 204, memory system 206, processor system 208, and/or input/output system 214 to each other. Communications system 212 may include machine-readable media such as any one of, some of, any combination of, or all of electrical cables, fiber optic cables, long term and/or short term storage (e.g., for sharing data) and/or means of sending signals through air (e.g., wireless communications), for example. Some examples of means of sending signals through air include systems for transmitting electromagnetic waves such as infrared and/or radio waves and/or systems for sending sound waves.

Input/output system 214 may include devices that have the dual function as input and output devices. For example, input/output system 214 may include one or more touch sensitive display screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 214 is optional, and may be used in addition to or in place of output system 202 and/or input device 204.

Figure 3:
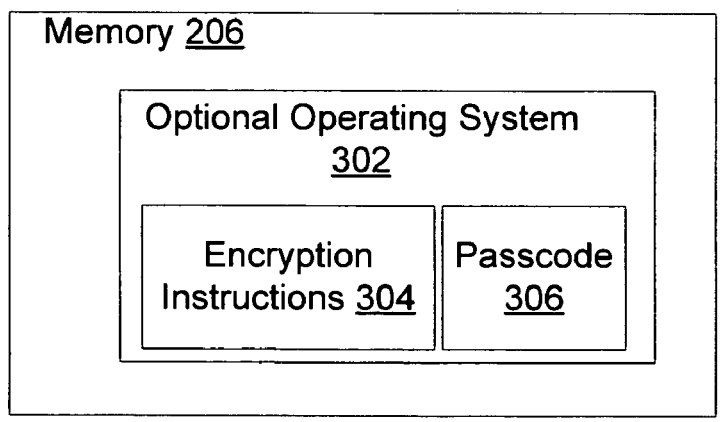
FIG. 3 shows a block diagram of an example of the memory of FIG. 2.

FIG. 3 shows a block diagram of an example of memory 206. Memory 206 may include optional operating system 302, encryption instructions 304, and passcode 306. In other embodiments system memory 206 may not have all of the components listed above or may have other components instead of and/or in addition to those listed above.

Memory 206 may contain optional operating system 302. Some examples of optional operating system 302 are Linux, Unix, Windows, and DOS. However, any other operating system may be used instead, including specialized operating systems such as for cell phones, video game players, other hand held devices, or any other operating system.

Encryption instructions 304 may cause unsecured system 200 to encrypt and/or decrypt items. Encryption instructions 304 may be an embodiment of encryption instructions 128. In an embodiment, encryption instructions 304 will only perform encryption and/or decryption if requested by secure module 102 and/or if secure module sends one of encryption keys 122, thereby granting permission for the encryption to take place.

Passcode 306 is stored by unsecured system 200 and is used to authenticate a request for encoding and/or decoding an item. In an embodiment, passcode 306 is generated by secure module 102, sent to unsecured system 126, and then stored at unsecured system 126 for authentication of a later request for encrypting and/or decrypting data. When it is desired to encrypt or decrypt data, passcode 306 is sent back to secure module 102, and secure module 102 determines whether passcode 306 was the passcode supplied earlier. If passcode 306 is the earlier supplied passcode, secure module 102 sends one of encryption keys 122, which encryption instructions 304 use to encrypt the desired data. In another embodiment, passcode 306 is not used at all.

In still another embodiment, the key $K_d$ is encrypted before it is sent from secure module 102 to unsecured system 126. In some encryption schemes, passcode 306 may be used as an encryption key to encrypt key $K_d$. For example, if passcode 306 is 256 bits, then AES 256 bit encryption could use passcode 306 as the key and encrypt key $K_d$, denoted as $E(K_d)$. Then $E(K_d)$ is transmitted to unsecured system 126, where the unsecured system 126 executes a AES 256 bit decryption code, and its copy of passcode 306 to decrypt $E(K_d)$ so that the unsecured system 126 has possession of key $K_d$. Other encryption methods may also be used to securely transmit $K_d$ from secure module 102 to unsecured system 126, such as DES, Blowfish, or RSA.

Throughout this specification, other embodiments may be obtained by replacing encryption instructions 304 with instructions to perform a task, and replace any discussion of encryption instructions 304 performing encryption or decryption with the instructions performing that task.

Figure 4:
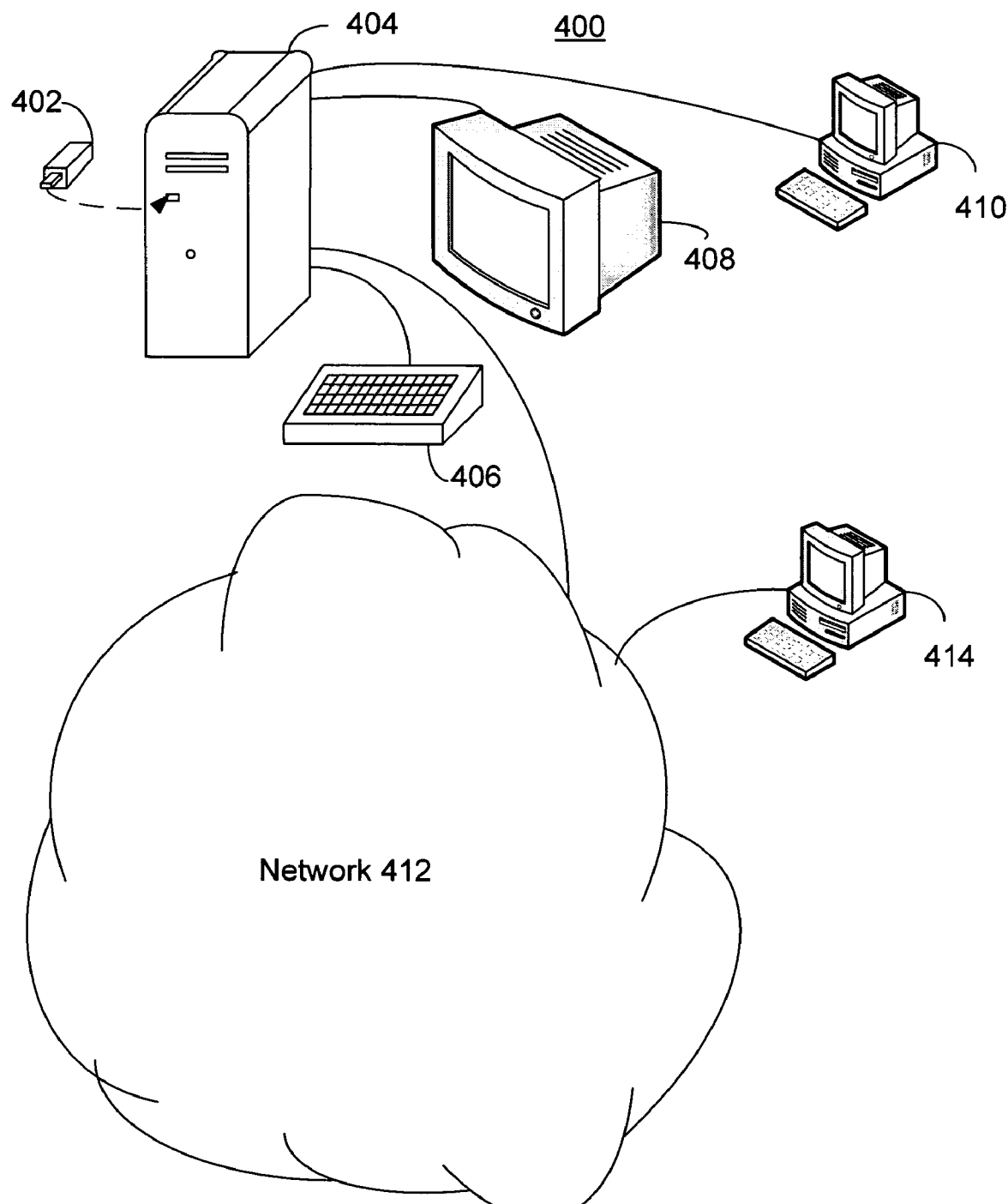
FIG. 4 shows an example of an embodiment of a secure system.

FIG. 4 shows an example of an embodiment of a secure system 400. Secure system 400 includes secure module 402, computer 404 having input system 406 and output system 408. Secure system 400 also includes system 410, network 412, and system 414. In other embodiments secure system 400 may not have all of the components listed above or may have other components instead of and/or in addition to those listed above.

Secure system 400 illustrates some of the variations of the manners of implementing system 100. Secure module 402 is one embodiment of secure module 102. Secure module 402 is capable of being plugged into and communicating with computer 404 or with other systems via computer 404. Secure module 402 may communicate wirelessly with computer 404 in addition to, or instead of, being capable of being plugged into computer 404. A user may use input system 406 and output system 408 to communicate with secure module 102.

Computer 404 is directly connected to system 410, and is connected, via network 412, to system 414. Network 412 may be any one or any combination of one or more Local Area Networks (LANs), Wide Area Networks (WANs), wireless networks, telephones networks, and/or other networks. Unsecured system 126 may be any of, a part of any of, or any combination of any of computer 404, system 410, network 412, and/or system 414. As an example, unsecured system 126 and encryption instructions 128 may be located on computer 404. As yet another example, unsecured system 126 and encryption instructions 128 may both be located on system 416 or may both be located on system 410.

Figure 5:
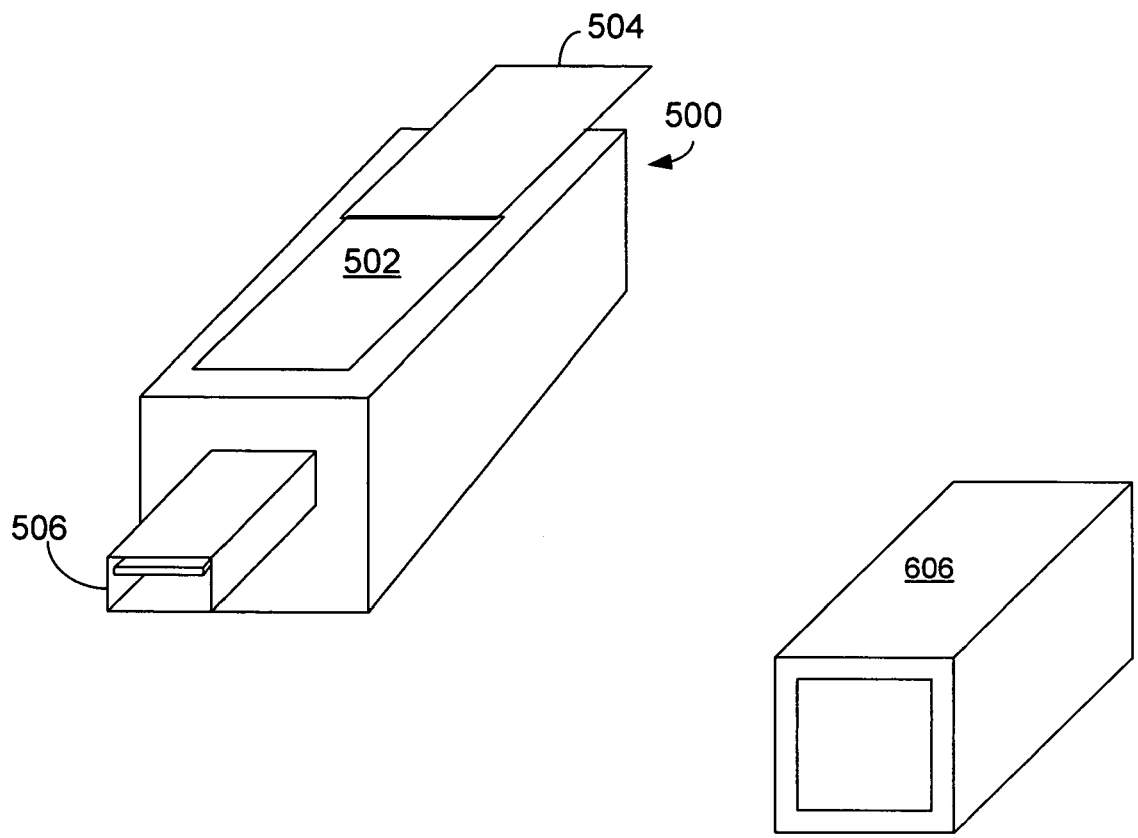
FIG. 5 shows an example of a secure module.

FIG. 5 shows one example of a secure module 500, which may include sensor 502, cover 504, and interface 506. In other embodiments, secure module 500 may not have all of the components listed above or may have other components instead of and/or in addition to those listed above.

Secure module 500 is an example of secure module 102 or 402. Sensor 502 may be a mechanism of acquiring fingerprints, and is an example of acquisition mechanism 104. Cover 504 may be a cover for covering sensor 502, and for protecting sensor 502 when sensor 502 is not in use. Cover 504 may swing open, slide open, and/or snap off and on. Interface 506 is an example of interface 124, and is for connecting with an electronic device, such as a computer. Interface 506 may be a USB port or may be replaced with an RS 232 connection, a wireless connection using RFID, a serial port or any of a number of other types of connections.

Figure 6:
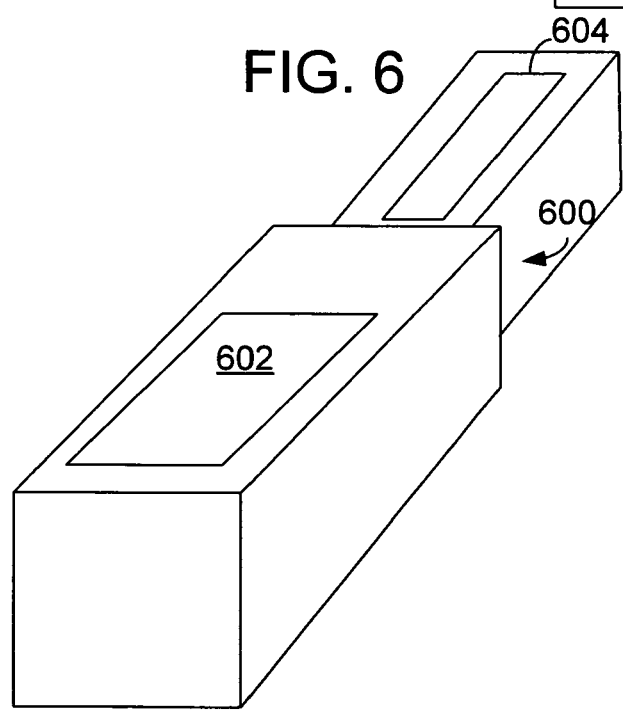
FIG. 6 shows an example of a secure module.

FIG. 6 shows an example of a secure module 600. Secure module 600 includes display 602, sensor 604, and cover 606. In other embodiments secure module 600 may not have all of the components listed above or may have other components instead of and/or in addition to those listed above.

Secure module 600 is an embodiment of secure module 102. Secure module 600 may be used instead of secure module 402 in FIG. 4. Display 602 displays passcodes and/or encryption keys, and is an example of interface 124. Display 602 is an interface with which the user interacts with secure module 102, and may be used for transferring the passcode or encryption key to unsecured system 126. Optionally, secure module 600 may also include a transmitter for transmitting the passcode or encryption key via radio waves, light pulses, and/or sound, for example, as part of interface 124. Sensor 604 is an example of acquisition mechanism 104, and maybe for acquiring fingerprints and/or images of other parts of the body of the user. The user may swipe her or his finger over sensor 604. In response, display 602 may display a passcode and/or encryption key that is only good for one use. The user reads the passcode or encryption key and causes the passcode and/or encryption key to be submitted to unsecured system 126. Cover 606 slides over the portion of secure module 600 having sensor 604 to protect sensor 604 from damage when not in use.

Figure 7:
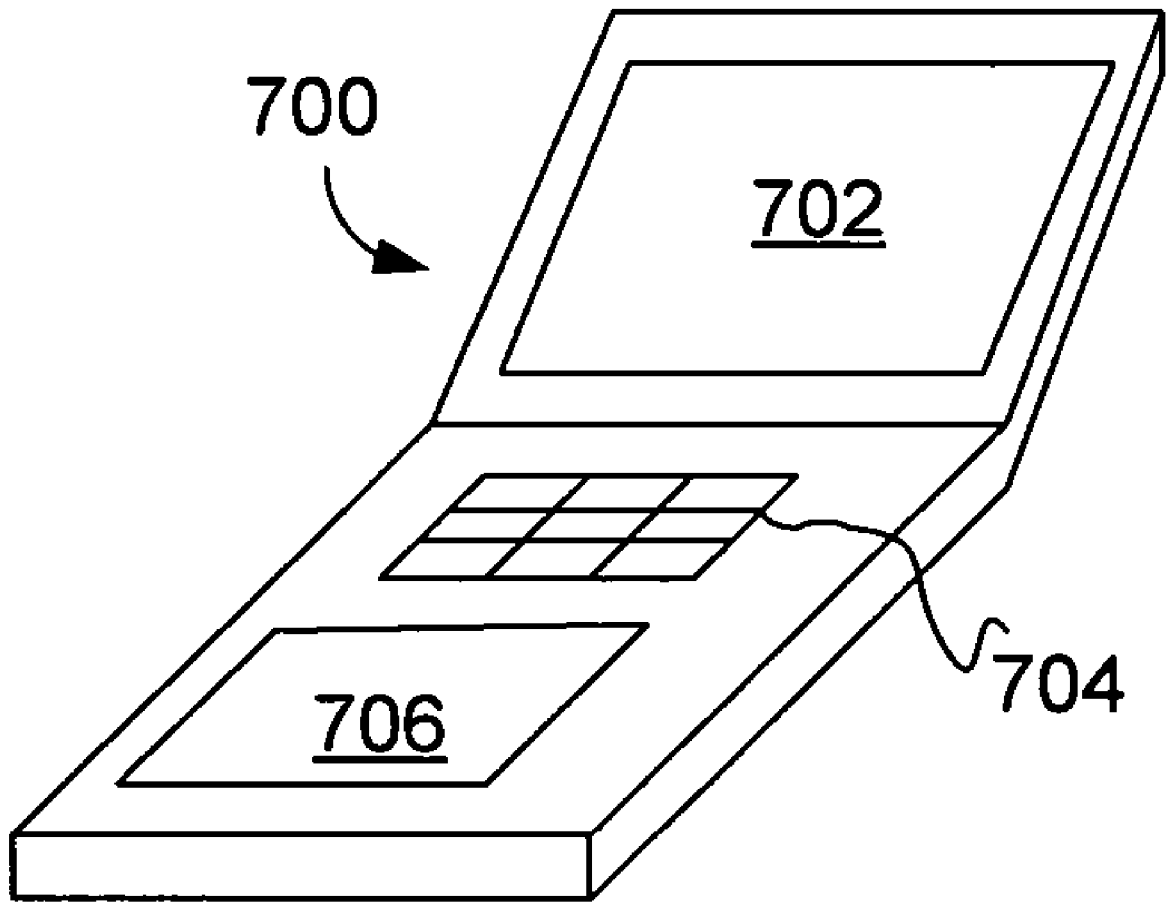
FIG. 7 shows an example of a secure module.

FIG. 7 shows an example of a secure module 700, which may include display 702, keypad 704, and sensor 706. In other embodiments secure module 700 may not have all of the components listed above or may have other components instead of and/or in addition to those listed above.

Secure module 700 is an example of secure module 102 (FIG. 1), which may be used instead of secure module 402 in FIG. 4. Display 702 is an example of interface 124, and may display passcodes, encryption keys, status information, instructions, replies to commands, for example. Optionally, secure module 700 may also include a transmitter for transmitting the passcode or encryption key via radio waves, light pulses, and/or sound, for example, as part of interface 124. Keypad 704 is for entering user information and commands, for example, and may be part of acquisition mechanism 104. Sensor 706 may be for acquiring fingerprints and/or images of other parts of the body of the user, and is also part of acquisition mechanism 104. Having both keypad 704 and sensor 706 allows secure module 700 to be configured to require that the user enter identifying information, such as social security number and birthday, in addition to the user data acquired via sensor 706.

Anyone of, or any combination of, secure modules 600 and 700 maybe used in place of, or in addition to, secure module 402 within secure system 400, for example. Secure modules 402, 500, 600, and 700 are just a few examples of the many embodiments of secure module 102.

Figure 8:
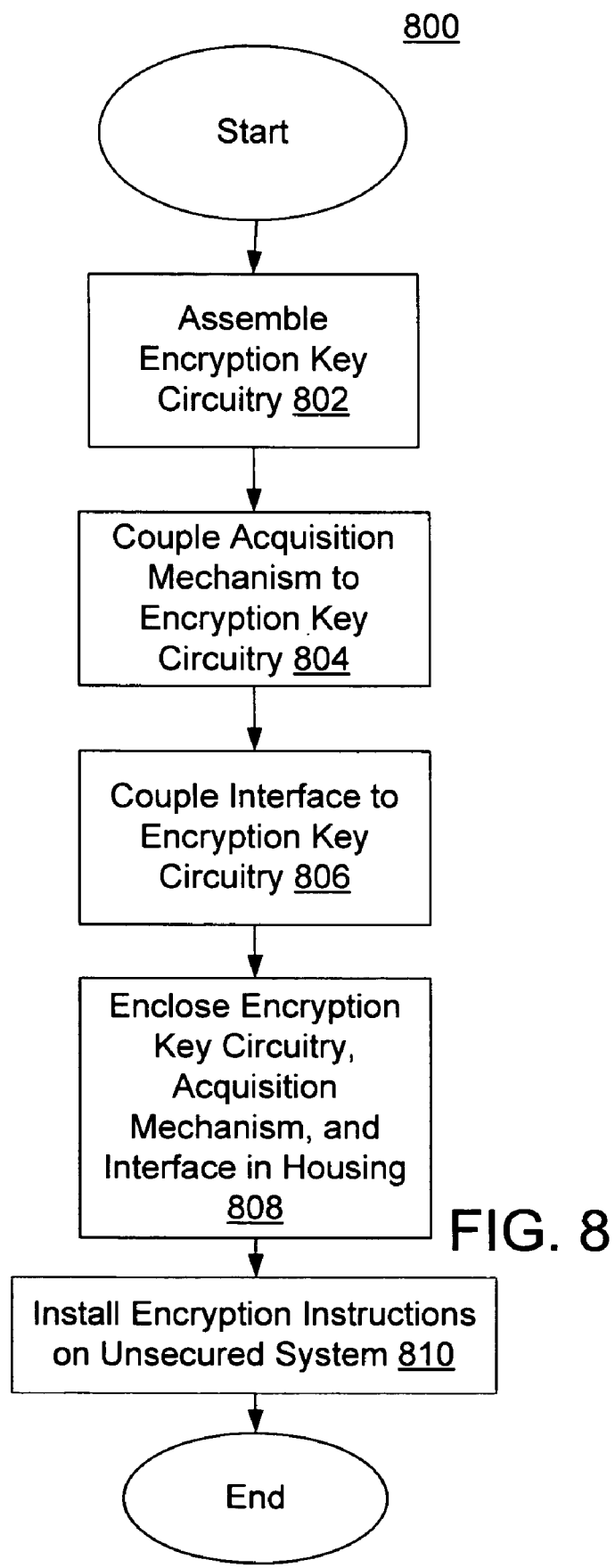
FIG. 8 shows a flowchart of an example of a method for assembling a secure module.

FIG. 8 is a flowchart of an example of a method 800 for assembling secure module 102. In step 802, secure area 106 (FIG. 1) is assembled, which may include installing memory 110 onto encryption key circuitry 108. In step 804, the acquisition mechanism 104 (FIG. 1) is coupled to the secure area 106. In step 806, interface 124 (FIG. 1) is coupled to secure area 106. In step 808, instructions 112 and/or other instructions are installed. In step 810, secure area 106, acquisition mechanism 104, and interface 124 are enclosed within a housing that is small enough to fit within a user's hand (e.g., shorter than a typical pen and no more than a two or three times wider than a typical pen). For example, the housing may be 2 to 6 inches long and less than a half inch in diameter. The secure module 102 may be of a size that is comparable to a thumb print. In other words, secure module 102 only needs to be large enough to accept user information. In embodiments where the user information is fingerprints, the secure module 102 could be the size of a portion of a thumb large enough to capture a thumb print during a swipe, for example. In embodiments where acquisition mechanism 104 is a camera, secure module 102 does not need to be much larger than a small camera. In an embodiment, secure module 102 is less than 6 inches, less than 2 inches, less than an inch, or less than a centimeter in size.

In step 810, encryption instructions 128 are installed on unsecured system 126. Step 810 may be performed at any time with respect to steps 802-808. In other embodiments method 800 may not have all of the steps listed above or may have other steps instead of and/or in addition to those listed above. Additionally, the steps of method 800 may be performed in other orders, may not be distinct steps, and/or many of the steps may be performed concurrently with one another. Additionally the steps of method 800 may not be distinct steps.

Figure 9:
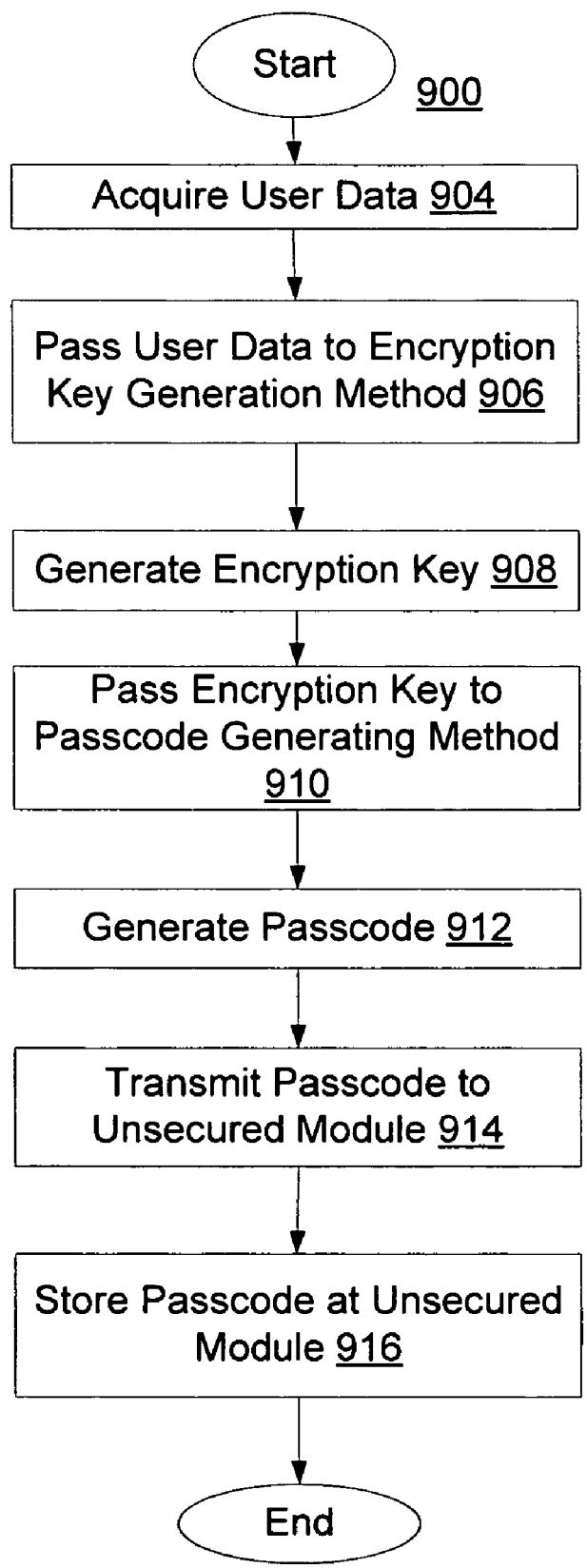
FIG. 9 shows a flowchart of an example of a method of setting up the system of FIG. 1.

FIG. 9 shows a flowchart of an example of a method 900 of setting up system 100. During method 900 in step 904 user data is acquired. Acquiring user data may involve a user entering data and/or acquisition mechanism 104 sensing biometric information. Step 904 may also involve encryption key circuitry 108 executing acquire data 114 and store user data 118, thereby causing encryption key circuitry 108 to transfer the user data from acquisition mechanism 104 to memory 110 and store the user data at memory 110.

In step 906, the acquired user data is passed, inside of the secure module 102, to a one-way hash function or another type of one-way method of encoding user data. In step 908, generate encryption keys 123 is executed, and the one-way method generates an encryption key, $K_d$. In step 910, on secure module 102, the encryption key, $K_d$ is passed to a one-way hash function or another type of one way method $\Phi$. In step 912, the value $P_d = \Phi(K_d)$, a passcode, is computed on secure module 102 and subsequently, in step 914, passcode $P_d$ is transmitted to unsecured system 126. In step 916, unsecured system 126 stores passcode $P_d$. If an intruder finds passcode $P_d$ on unsecured system 126, the information obtained from passcode $P_d$ is not helpful to the intruder, because the inverse of the encoding function, $\Phi^{-1}$ is computationally difficult to compute.

Steps 902-914 may involve executing other instructions of instructions 112 in additions to, or instead of, those that appear in FIG. 1. Step 810 could be performed as part of method 900 instead of as part of method 800. Other embodiments may not include all of the above steps and/or may include other steps in addition to or instead of those listed in method 900. Additionally the steps listed in method 900 may not be distinct steps.

Figure 10:
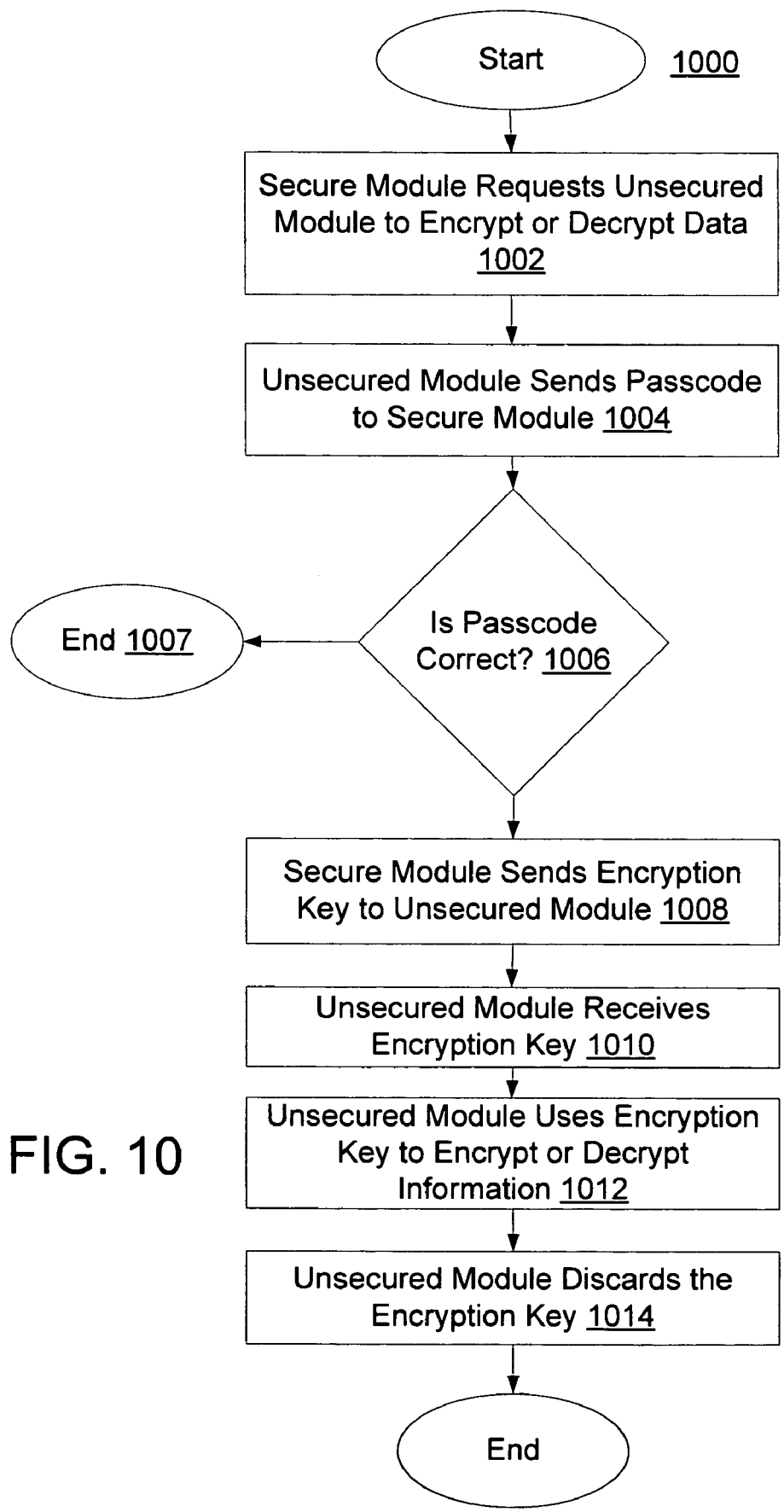
FIG. 10 shows a flowchart of an example of a method for encrypting or decrypting data.

FIG. 10 shows a flowchart of an example of a method 1000 for encrypting or decrypting data. In step 1002, encryption key circuitry 108 makes a request to the unsecured system 126 to encrypt or decrypt some data. The request may be in response to a user entering user data (e.g., the user scanning a fingerprint into authentication mechanism 104), and the user data being authenticated. In step 1004, unsecured system 126 sends the passcode $P_d$ to the secure module 102. In step 1006, secure module 102 authenticates the unsecured system 126, by checking whether passcode $P_d$ is correct. If passcode $P_d$ is not correct, then in step 1007 method 1000 is terminated. Consequently, encryption key $K_d$ is not passed to unsecured system 126. The reason for not passing encryption key $K_d$ is because it is expected that an intruder program is running and attempting to perform the encryption or decryption.

Returning to step 1006, if passcode $P_d$ is correct, then in step 1008 secure module 102 retrieves encryption key $K_d$ from memory 110 (e.g., flash memory) and transmits encryption key $K_d$ to unsecured system 126. In another embodiment, step 1008 may involve encrypting encryption key $K_d$ is before sending encryption key $K_d$ from secure module 102 to unsecured system 126. For example, passcode 306 may be used as an encryption key to encrypt encryption key $K_d$. If passcode 306 is 256 bits, then AES 256 bit encryption could use passcode 306 as the encryption key and encrypt encryption key $K_d$. The encrypted encryption key may be denoted by $E(K_d)$. Then the encrypted encryption $E(K_d)$ is transmitted to unsecured system 126.

In step 1010, unsecured system 126 receives (e.g., accepts) encryption key $K_d$. Receiving encryption key $K_d$, may involve receiving encrypted encryption key $E(K_d)$. Additionally, step 1010 may involve unsecured system 126 executing an AES 256 bit decryption code, using the copy of passcode 306 stored at unsecured system 126 to decrypt $E(K_d)$ so that unsecured system 126 has possession of key $K_d$. Other encryption methods may also be used to securely transmit $K_d$ from secure module 102 to unsecured system 126, such as DES, Blowfish, or RSA.

In step 1012, unsecured system 126 uses encryption key $K_d$ to encrypt or decrypt the data. In step 1014, encryption key $K_d$ is discarded. Encryption key $K_d$ is not stored on unsecured system 126; encryption key $K_d$ only remains in the volatile memory of unsecured system 126 for a brief period of time. Immediately, after the encryption or decryption process is finished making use of encryption key $K_d$, the volatile memory, which contains encryption key $K_d$, is erased. Encryption key $K_d$ may be erased using any of several methods. For example, a value containing no information, such as the number 0, written at the one or more memory locations where encryption key $K_d$ was located. As another example, a value containing information that is unrelated to encryption key $K_d$ is written in the location where encryption key $K_d$ was located. Since encryption key $K_d$ is in the unsecured system 126, which is not secure, for only a short while, it is difficult for an intruder to copy encryption key $K_d$. Other embodiments may not include all of the above steps and/or may include other steps in addition to or instead of those listed in method 1000. Additionally the steps listed in method 1000 may not be distinct steps.

Any of the various embodiments described above may be used separately or in any combination together with one another. The various features of each of the embodiments may be interchanged with one another to get new embodiments.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine-implemented method comprising:

installing on a hardware system one or more instructions, which when implemented cause the hardware system to implement a process including at least, in response to receiving a request for performing a task, sending a passcode from the hardware system to a hardware module for authentication, the passcode having been previously stored on the hardware system, and generating the passcode from an access key that was generated from user information;

sending an access key generated from user information, from the hardware module to the hardware system to enable the hardware system to perform the generating of the passcode;

the hardware module storing one or more machine instructions, which when implemented cause the hardware module to at least implement a setup process that only requires input from the user of the hardware module without requiring input from another, and to at least send from the hardware module to the hardware system the request to perform the task at the hardware system;

wherein the access key is not stored on the hardware system after the sending of the passcode.

2. The method of claim 1, further comprising:
storing the access key on the hardware module.

3. The method of claim 2, wherein the access key, that is based on the user information, is the only key stored at the hardware module while the access key is stored.

4. The method of claim 1, further comprising:
acquiring user data.

5. The method of claim 4, further comprising:
extracting user information from the user data.

6. The method of claim 5, further comprising:
storing the user information.

7. The method of claim 6, further comprising:
applying a one-way method to the user information, therein generating the access key.

8. The method of claim 1, wherein as a result of implementing the instructions stored on the hardware module, after an initial access key is generated subsequent access keys are only generated from prior access keys of the user of the subsequent access key, which is the user of the prior access keys.

9. The method of claim 1, wherein as a result of implementing the instructions stored on the hardware module after an initial passcode is generated subsequent passcodes are only generated from prior access keys of the user of the subsequent passcodes, which is the user of the prior access keys.

10. A machine-implemented method comprising:
acquiring user data;
extracting user information from the user data;
storing the user information;
applying a one-way method to the user information, therein generating an access key;
wherein the one-way method includes at least a hash function; and
sending the access key from a module to a system to enable the system to generate a passcode;
wherein the generated passcode is not stored on the module after the sending of the passcode.

11. A machine readable medium storing one or more machine instructions, which when invoked cause the machine to implement the method of claim 10.

12. A device configured to implement the method of claim 10, the device comprising the module.

13. A machine-implemented method comprising:
acquiring user data;
extracting user information from the user data;
storing the user information;
applying a one-way method to the user information, therein generating an encryption key;
sending the encryption key to a system to enable the system to generate a passcode based on the encryption key; and
storing the encryption key on a module;
wherein the generated passcode is not stored on the module.

14. A machine readable medium storing one or more machine instructions, which when invoked cause the machine to implement the method of claim 13.

15. A device configured to implement the method of claim 13, the device comprising the module.

16. A machine-implemented method comprising:
installing one or more instructions that require an access key on a hardware system;
installing one or more instructions on the hardware system, which when implemented cause the hardware system to implement a method including at least
sending a passcode, generated from an access key that is generated from user information, from the hardware system to a hardware module in response to a request to perform a task;
receiving an access key generated from user information at the hardware system upon verification of the passcode; and
using the access key to execute the instructions installed on the hardware system;
wherein the hardware system does not store the access key.

17. The method of claim 16, further comprising:
generating the passcode at the hardware system based on the access key.

18. The method of claim 17, further comprising:
storing the passcode on the hardware system.

19. The method of claim 16, wherein the one or more instructions requiring the access key are one or more encryption instructions.

20. A machine-implemented method comprising:
installing on a hardware system one or more machine instructions, which when implemented cause the hardware system to at least perform a requested task using an access key; wherein the hardware system does not store the access key;
the hardware module implementing a setup process that only requires input form a user of the hardware module for which the access key and passcode are generated, the process including at least
acquiring user data;
extracting user information from the user data;
storing the user information;
applying a one-way method to the user information, therein generating an access key; wherein the one way method includes at least a hash function;
the hardware module storing one or more instructions, which when implemented cause the hardware module to implement a method including at least sending the request to perform the task to the hardware system;
in response to sending the request, receiving from the hardware system a passcode for authentication that was previously stored at the hardware system; wherein the passcode was generated from the access key;
comparing the passcode that was received with a passcode generated on the hardware module; and
sending the access key from the hardware module to the hardware system upon verification of the passcode that was received.

21. A machine-implemented method comprising:
acquiring user data;
extracting user information from the user data at a hardware module having at least one processor and a storage area;
storing the user information in the storage area;
the at least one processor applying a one-way method to the user information, therein generating the access key; wherein the one-way method includes at least a hash function; and
sending an access key from the hardware module to a hardware system to enable the hardware system to generate a passcode;
wherein the generated passcode is not stored on the hardware module after the sending of the passcode.

22. A machine readable medium storing one or more machine instructions, which when invoked cause the machine to implement the method of claim 21.

23. A device configured to implement the method of claim 21, the device comprising the hardware module.

24. A machine-implemented method comprising:
acquiring user data at a hardware module having a processor system having at least one processor;
extracting user information from the user data at the hardware module;
storing the user information at the hardware module;
the processor system of the hardware module applying a one-way method to the user information, therein generating the access key;
the hardware module sending the encryption to s hardware system to enable the hardware system to generate a passcode based on the encryption key; and
storing the encryption key on the hardware module;
wherein the generated passcode is not stored on the hardware module.

25. A machine readable medium storing one or more machine instructions, which when invoked cause the machine to implement the method of claim 24.

26. A device configured to implement the method of claim 24, the device comprising the hardware module.

27. A machine-implemented method comprising:
installing on a hardware system one or more instructions, which when implemented cause the hardware system to implement a process including at least,
in response to receiving a request for performing a task, sending a passcode from the hardware system to a hardware module for authentication, the passcode having been previously stored on the hardware system, and
generating the passcode from an access key that was generated from user information;
receiving an access key generated from user information, at the hardware system from the hardware module to enable the hardware system to perform the generating of the passcode;
the hardware module storing one or more machine instructions, which when implemented cause the hardware module to at least implement a setup process that only requires input from the user of the hardware module without requiring input from another, and to at least send from the hardware module to the hardware system the request to perform the task at the hardware system;
wherein the access key is not stored on the hardware system after the sending of the passcode.

\* \* \* \* \*